Figure 9:
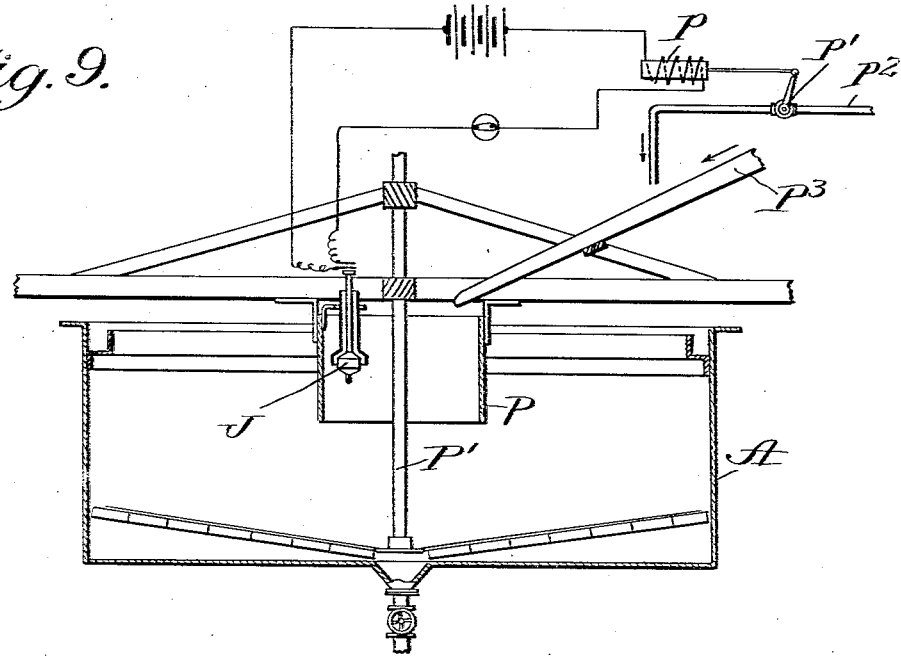

J. VAN N. DORR.
APPARATUS FOR CONTINUOUSLY SEPARATING SOLIDS FROM LIQUIDS.
APPLICATION FILED MAY 8, 1914.
1,140,131.
Patented May 18, 1915.
4 SHEETS—SHEET 1.
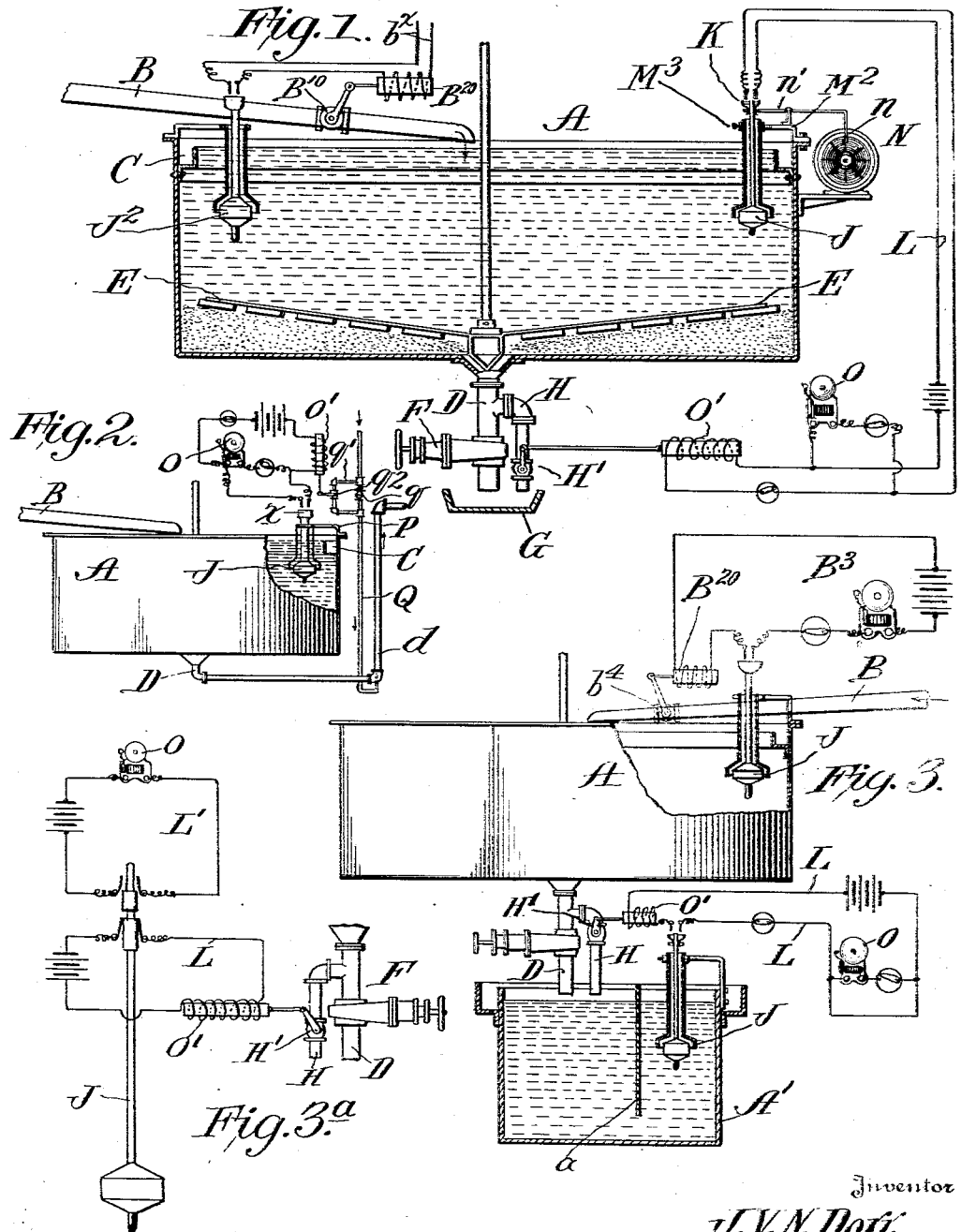

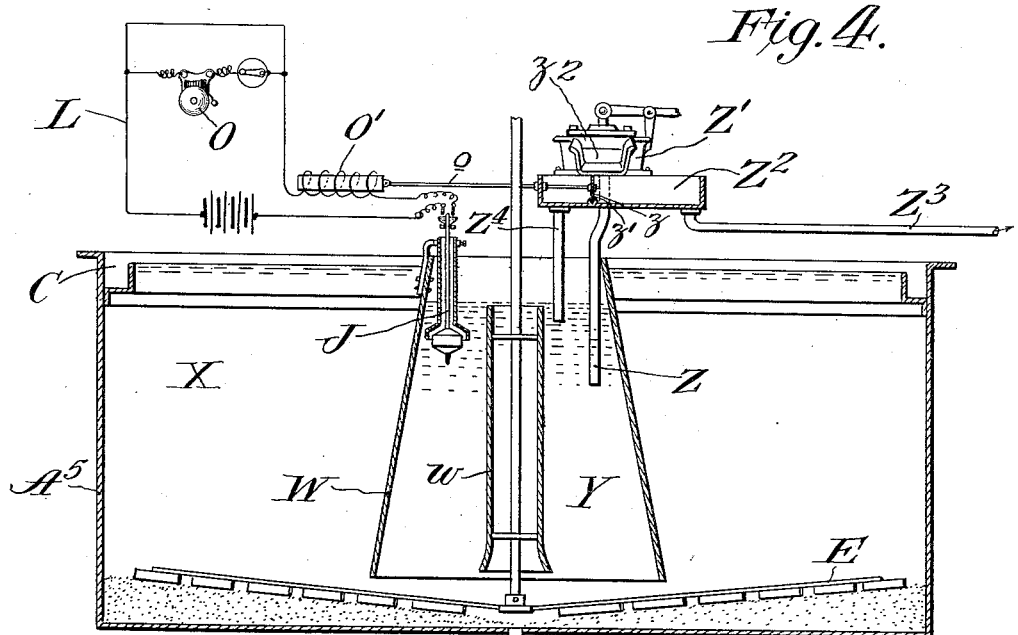

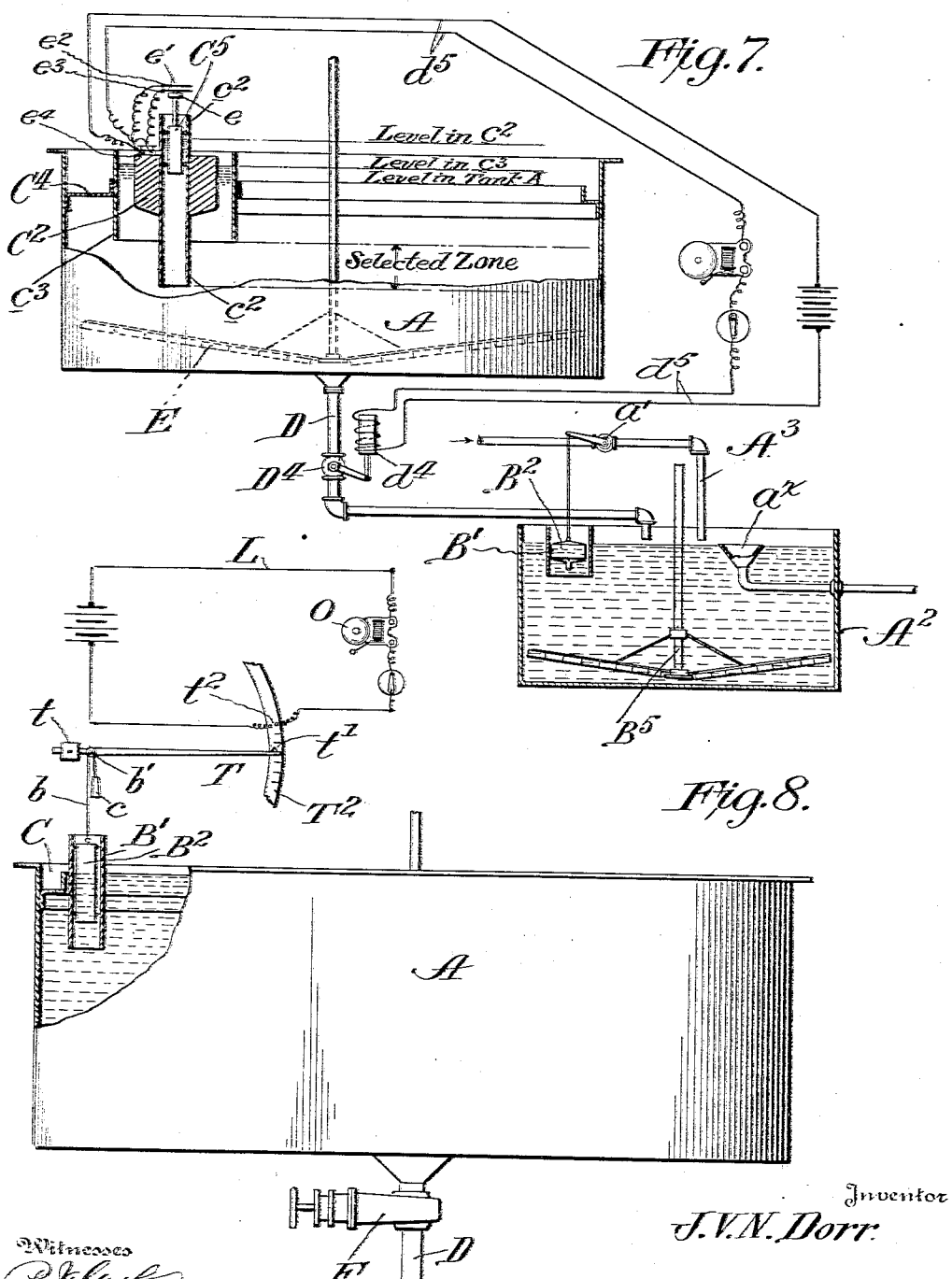

J. VAN N. DORR.
APPARATUS FOR CONTINUOUSLY SEPARATING SOLIDS FROM LIQUIDS.
APPLICATION FILED MAY 8, 1914.

1,140,131.

Patented May 18, 1915.
4 SHEETS—SHEET 4.

UNITED STATES PATENT OFFICE.

JOHN VAN NOSTRAND DORR, OF DENVER, COLORADO.

APPARATUS FOR CONTINUOUSLY SEPARATING SOLIDS FROM LIQUIDS.

1,140,131.  Specification of Letters Patent.  Patented May 18, 1915.

Application filed May 8, 1914. Serial No. 837,304.

*To all whom it may concern:*

Be it known that I, JOHN VAN NOSTRAND DORR, a citizen of the United States, residing in Denver, in the county of Denver and State of Colorado, have invented certain new and useful Improvements in Apparatus for Continuously Separating Solids from Liquids, of which the following is a specification.

This invention relates to apparatus for settling or separating finely divided solids from a portion of the liquid in which they are suspended or for separating quickly settling solids from those suspended in the same liquid which settle more slowly. In many metallurgical and other industrial processes it is necessary to separate a portion of the liquid from the solids suspended in it. In the cyanid process of recovering values from ores, for instance, the finely divided material or pulp as it comes from the crushing plant may contain only from 10% to 20% of solids, while for filtration and other methods of treatment it should be thickened to such an extent that it shall contain from 40% to 50% solids. In order to obtain this result the pulp is most economically treated in thickeners or decanters where the solids are caused to settle in tanks while a part of the solution containing the values and which is clear or relatively clear is made to overflow from the settling vessel. Apparatus of this kind is shown in my U. S. Patent No. 867,958 of October 15, 1907. Apparatus of the kind shown in said patent has also been used for classification purposes where quickly settling solids are separated from those suspended in the same liquid which settle more slowly.

It is very desirable that the apparatus should be so operated in many cases as to discharge substantially all the solid material containing only a portion of the liquid at the required density and to overflow as nearly as possible clear liquid. This result is difficult to obtain where the rate of feed or the nature of the material varies, or when the discharge from the vessed is clogged by foreign matter, and therefore close supervision of the apparatus at a large cost for labor has heretofore been necessary. It is also very desirable in other cases to obtain a fixed density of underflow or in the settled material discharged from the apparatus. The density of the underflow of the settled material in practice varies owing to many causes and this has also required close supervision.

It is well understood that when it is desired to overflow light solid matter from heavier underflowing solids it is necessary to keep the layer of liquid or pulp near the surface as nearly as possible at a constant density. It is also known that a mixture of a liquid with solids suspended therein has the same properties as a homogeneous liquid of the specific gravity or density of the mixture.

With these conditions in view the object of my invention is to provide means for automatically giving a warning when a change of density occurs in a selected zone of the liquid being clarified or in the discharged underflowing material in order that the attendant may be called to correct such disturbance and to also in some cases automatically regulate the discharge of the underflowing material for the purpose of maintaining constant conditions in the underflow or the overflow or in both.

Another object of the invention is to automatically record the condition or density of the liquid under treatment.

In carrying out my invention I may proceed in various ways. For some purposes I preferably equip the settling or decanting vessel with an hydrometer which rises and falls as the density of the liquid in a predetermined zone varies and which may be made to operate mechanism which records the density in said zone of such liquid at all times, and which further, when moved to a predetermined extent from its normal position by a change in density at the selected zone causes an alarm to be sounded, or if desired, causes apparatus to be operated which so regulates the discharge of the settled material as to correct the disturbance. I may so construct the apparatus as to both sound an alarm and to automatically regulate the discharge, or I may cause an alarm to be sounded or the discharge to be regulated, or both by apparatus actuated by a change of density in the discharged material in a vessel connected with said apparatus.

When the apparatus is employed as a thickener for the purpose of overflowing practically clear liquid and underflowing thickened or settled material, it is necessary at times to regulate the feed of the pulp or other material to be treated. At other times it is necessary to regulate the discharge of the thickened material and again it is often necessary to regulate both the feed of the pulp and the discharge of the thickened material. In the apparatus shown in the accompanying drawings I have shown means whereby such regulations may be effected to suit the different conditions specified and also other conditions which will be hereinafter referred to.

Where the apparatus is used as a classifier, or where my improvements are applied to classifiers it is often necessary to regulate the discharge of the settled or thickened material and the feed of the material to be treated. This may be done in various ways as will be hereinafter more fully explained.

In the accompanying drawings I have shown my improvements applied to apparatus of well known construction and of the general kind shown in my patent above mentioned. This apparatus is commonly used in the cyanid process of recovering values from crushed ore and where the crushed ore suspended in water or solution is treated in what are known as thickeners or decanting vessels. The apparatus may, however, as before stated be used in classifying and in fact many other wet metallurgical processes, and my invention may be applied to other forms of apparatus for separating solids from slowly moving liquids in which they are suspended or to separate quickly settling solids from those settling more gradually.

Figure 1 shows in vertical section a thickener or decanting vessel with my improvements applied for the purpose of indicating and registering the density in a selected zone of the liquid in the vessel and it also shows how the discharge of the thickened material may be automatically regulated, and further how the feed of the pulp may be regulated when conditions require it. Fig. 2 is a similar view of a modification. Fig. 3 shows another modification in which the thickener discharges into another vessel and in which the discharge of the thickened material from the thickener is regulated automatically by changes in density of the liquid in said second mentioned vessel. Fig. 3ª is a diagrammatic view showing how the discharge of thickened material from a decanting vessel may be automatically regulated and how if the density of the liquid in the vessel increases to such an extent that the discharge of the thickened material cannot be automatically regulated, a warning may be automatically given. Fig. 4 shows in vertical section a combined settling and agitating vessel with my improvements applied. Fig. 5 is a view on an enlarged scale and in vertical section of a hydrometer preferably employed in connection with means for closing an electric circuit and with means for protecting the hydrometer float from the deposit of solid matter. Fig. 6 is a similar view of a modified form of hydrometer and casing. Figs. 6ª and 6ᵇ are detail views of a circuit closer operated by the hydrometer and which is constructed to hold the circuit closed until the density in the liquid under treatment decreases to a sufficient extent. Fig. 7 shows another modification in which devices are employed for varying the admission or feed of a liquid for the purpose of regulating the density of the thickened material received from the thickener. Fig. 7 also shows how the rate of the discharge of the thickened material may be automatically controlled by changes in the density of the material in a selected zone of the thickening vessel. Figs. 8 and 9 show further modifications.

In Fig. 1 A indicates a thickener or decanter of the kind shown in my U. S. Patent No. 867,958. The vessel may be supplied with crushed ore or slimes mixed with cyanid or similar solution by a trough B and it is provided with an overflow launder C for clear liquid and a discharge pipe D for the thickened material. E indicates a slowly moving sweep for keeping the solids in suspension and for moving the settled material toward the discharge orifice. F indicates a hand-regulated cock for the pipe D which latter discharges into a trough G. H indicates a branch pipe delivering into the trough G and provided with a cock H'. The operation of separating clear liquid or solution from the solid material may be performed in the usual way, the thickened material continuously and slowly passing through the discharge pipe D to the trough G and the clear or relatively clear liquid or solution continuously and slowly overflowing into the launder C and passing therefrom to any suitable receptacle.

It has been found in practice that owing to the nature of the material fed or to obstructions in the discharge pipe for the thickened material, the overflow will at times not be clear and therefore close inspection has been required in order to prevent this. It has also been found that owing to various conditions the underflow cannot be maintained at a definite or a desired density. I have found that such close inspection is not necessary as the attendant may be notified of any substantial change in density of the liquid by a suitable alarm, and furthermore means may be provided for automatically regulating the discharge of the thickened material in such manner that a substantially uniform density is insured. I may also, when conditions require it, automatically regulate the rate of feed of the pulp or the material to be treated.

In Fig. 1 I have shown the settling vessel provided with a hydrometer J which is made to close an electric circuit when the density of the liquid in a predetermined zone or layer in the upper part of the vessel varies and this circuit, as shown, includes a bell or similar audible alarm and also a solenoid which is made to operate a discharge cock for the settled material. The hydrometer J shown in Fig. 1 is also illustrated on a larger scale in Fig. 5. It comprises a float $j$ of relatively large diameter and a stem $j'$ of small diameter. The sensitiveness of the hydrometer, of course, largely depends upon the relative diameters of the stem and the bulb or float and the diameter or volume of the float may be increased or decreased to suit varying conditions. The lower portion of the float should have vertical side walls or downwardly and inwardly tapering walls for a reason hereinafter specified. At its upper end the stem $j'$ carries a mercury cup K or other device adapted to make contact with the terminals $k$, $k'$ of an electric circuit L. M indicates a casing for the hydrometer having a lower portion $m$ receiving the upper portion of the float $j$ and an upper portion $m'$ through which the stem extends. The part $m$ is provided with inwardly projecting studs $m^2$ for guiding the float. The purpose of the casing M is to prevent solid particles from lodging on the float.

In starting to use the apparatus any turbid liquid which may be within the casing is displaced by pouring clear liquid into the top thereof and thereafter turbid liquid is prevented from entering said casing by reason of the column of clear liquid in said casing. The crushed ore and solution, or the liquid pulp, is slowly fed to the thickening vessel, the thickened material being continuously discharged and a clear solution continuously overflowing. If for any reason the solid material does not settle with sufficient rapidity and the density of the liquid increases in the zone where the hydrometer is located, the solid material will not enter the casing M and there is no danger of deposite of solid particles on the float, but the hydrometer will rise owing to such increase in the density of the liquid below the edge of the casing and when this density increases to a certain extent the hydrometer will rise until it closes the electric circuit and causes an alarm to be given. The hydrometer may be raised and lowered or adjusted to the desired extent by means of any suitable devices. The casing M prevents particles of solid matter from being deposited on the top of the float $j$ and, as before stated, the sides of the float are made straight in order that particles of solid matter may not lodge thereon.

As shown in Figs. 1 and 5 the tube M is supported by a bracket $M^2$ provided with an adjusting screw $M^3$. I may employ a casing $M^4$ of the kind shown in Fig. 6 where it is shown as being of uniform diameter from top to bottom and as adjustably supported by a bracket $M^2$. In this case a skeleton wire frame V is arranged within the casing and attached thereto at $v$ being provided with guides $v'$ for the stem $j'$ of the hydrometer. The density of the liquid in a selected zone may be recorded by means of a recording apparatus N which may be operated by clockwork. The pen $n$ is actuated mechanically by means of a lever $n'$ connected directly with the stem of the hydrometer. When the density increases to such an extent as to endanger a proper overflow or a proper underflow or both, the electric circuit is closed by the mercury cup K and the contacts $k$, $k'$ and may cause a bell O to be rung or may actuate a solenoid $O'$, the core of which is connected with the cock $H'$ of the auxiliary discharge pipe H. In this way the attendant may be notified and may give proper attention to the apparatus to regulate it or restore it to normal conditions, or the solenoid only may be included in the circuit, and when the density in a selected zone is too great the discharge of the settled material may be increased and thus the overflow of clear liquid may be insured and the underflow or discharge of the thickened material may be restored to normal conditions.

Instead of employing circuit closing devices of the kind shown in Figs. 5 and 6, I may employ those illustrated in Figs. 6$^a$ and 6$^b$ in which case spring contact fingers $l$, $l'$ are shown as being supported on a bracket $l^2$ and these contact fingers are adapted to engage the upper end of the stem $j'$ of the hydrometer. The upper end of the stem is provided with a tapered piece of insulating material $j^2$. The stem $j'$ being of metal will close the circuit when the metal portion of the stem engages the contact fingers in the manner indicated in Fig. 6$^a$ and the circuit will be held closed until the hydrometer drops or descends. By this arrangement the circuit is held closed until the density of the liquid in the zone where the hydrometer operates has decreased to such an extent that the hydrometer will suddenly drop and disengage itself from the spring fingers $l$, $l'$. In this way the circuit is held closed for a definite time and the breaking of the circuit is permanent, that is to say, sparking, which might otherwise occur by up and down vibrations of the hydrometer, is avoided. Fig. 1 also shows means for automatically controlling the feed of the liquid pulp to the thickener. In this case the feed trough B is provided with a valve or feed regulator $B^{10}$ operated by a solenoid or other suitable electro-magnetic device $B^{20}$ included in a circuit $b^x$ which is controlled by a hydrometer $J^2$ similar to that hereinbefore mentioned. This automatic regulation of the feed is desirable under certain conditions. When not necessary it may be put out of use and only employed when a feed of a definite amount of pulp is required.

In Fig. 2 the vessel A is of substantially the same form as that before described and it is fed by a trough B and has a discharge pipe D and an overflow launder C. The hydrometer J is of the form shown in Fig. 5. Its stem carries a contact $x$ of any suitable kind for completing the circuit. The discharge pipe D is prolonged as indicated at $d$ and the discharged thickened material is raised and carried forward by compressed air admitted to the pipe Q by a valve at $q$ and also a branch pipe at $q'$ provided with a valve $q^2$. When the electric circuit is closed by the hydrometer the valve $q^2$ is opened admitting more compressed air to the pipe $d$ and increasing the discharge of thickened material from the vessel A, and thus preventing the overflow of solids at all times.

In Fig. 3 I have shown how the discharge of thickened material from the vessel A may be regulated by the density of the liquid discharged into another vessel, and also how the feed of the liquid pulp may be automatically regulated by variations in the density of the material in a selected zone of the thickening vessel for the purpose of having the settling tank operated at its maximum capacity and at the same time insuring a clear overflow. In this case the discharge pipe D and the branch pipe H deliver to a vessel A' in which the hydrometer is located. This vessel is divided by a partition $a$ into two parts or branches, into one of which the settled material is delivered from the tank A and in the other of which the hydrometer is located and from which the liquid overflows in the manner shown. When the hydrometer rises sufficiently it closes the electric circuit L and causes an alarm to be sounded and the discharge valve H' to be opened. The means for automatically regulating the feed of the pulp is similar to that shown in Fig. 1 and the parts of the apparatus are similarly lettered, but I preferably also include in this apparatus an audible alarm B³.

In Fig. 3ª devices are shown by means of which when the density of the liquid increases to a certain extent within the thickening tank a solenoid may be actuated to regulate the discharge from the vessel without sounding an alarm, but as shown, the mechanism is also such that should the density in the vessel increase beyond a certain amount another circuit L' is closed which sounds an alarm, the circuit L being at the same time held closed.

Fig. 4 shows my improvements applied to a combined thickener and agitator of the kind shown in my U. S. Patent No. 1,076,666. In this case the settling vessel A⁵ is provided with an overflow launder C and a slowly rotating sweep E and also with a cone-shaped vessel W dividing the thickener into a settling space X and an agitating space Y. D' indicates an air pipe discharging below a cylinder $w$ within the chamber Y. As described in my Patent No. 1,076,666, the solids settle to the bottom of the vessel A⁵ and are carried by the sweep E to the agitating space Y below the cylinder $w$ and are carried up through said cylinder by the air admitted at D', overflow from the top of said cylinder, descend into the space Y and are again carried up through said cylinder $w$. The ore pulp is continuously supplied to the vessel A⁵ and is continuously withdrawn therefrom through a pipe Z extending into the upper portion of the agitating space Y, all as described in my patent just mentioned. This pipe Z connects with a pump Z' of well known construction which delivers to a box or trough Z² with which connects a discharge pipe Z³. The box or trough Z² is provided with a partition $z$ which is hinged at $z'$ and divides the box into two compartments, one of which connects with the discharge pipe Z³, and the other with a pipe Z⁴ delivering to the agitating space Y. This partition $z$ is arranged in front of the mouth $z^2$ of the pump. Normally the partition occupies a vertical position as shown and some of the liquid withdrawn through the pipe Z by the pump Z' passes to the box Z² and out through the pipe Z³, and some of said liquid passes to the other compartment of the box Z² back through the pipe Z⁴ to the agitating space Y. By changing the position of the partition $z$ the amount of liquid returned to the agitating space Y may, of course, be varied and in order to automatically do this I provide a hydrometer J similar to that before described and operating in a similar manner to close an electric circuit L which may include a bell O and it also includes a solenoid O' connected by a rod $o$ with the partition $z$, the arrangement being such that when the circuit is closed the partition $z$ will be moved to arrest the return of the liquid through the pipe Z⁴ to the agitating space Y. In this way by varying the amount of discharge a uniform density in the discharged material may be obtained.

In Fig. 7 I have shown apparatus in which a thickener delivers thickened material to a mixing vessel or agitator and in connection with this apparatus I have shown automatically operated means for regulating the discharge of the thickened material and also means operated automatically by the density of the material in the mixer for controlling the feed of clear liquid or solution for the purpose of maintaining a predetermined density of the thickened material in the mixer. The vessel A as illustrated is a decanting vessel of the kind before described. The pipe D discharges the thickened material into a tank $A^2$ which in this case is a mixer or agitator. The discharge pipe D is provided with a valve $D^4$ which may be operated by a solenoid $d^4$ in an electric circuit $d^5$ which circuit may be made and broken in the manner indicated, or in any other suitable way. In this case, however, I have shown a float $C^2$ attached to a tube $c^2$ and located within a tubular casing $c^3$ attached by means of a bracket $C^4$ to the tank A. This tube $c^2$ extends above the liquid level in the tank and within this tube is another float $C^5$ carrying a contacting device $e$ adapted to close the circuit at $e'$. The contact devices, $e^2$, $e^3$ attached to the terminals $e^4$ are in this case spring fingers normally open, as shown in the drawings, but when the float $C^5$ rises to a sufficient extent the ends of the spring fingers are brought together and the circuit is closed at $e'$. The tube $c^2$ extends to a lower level in the tank than the tube $c^3$ and thus the lower edge of the tube $c^3$ is located at the top of a selected zone in the tank A and the lower edge of the tube $c^2$ is located at the bottom of such a selected zone. If the tank A contains clear liquid above the lower edge of the tube $c^2$ the liquid will stand at the same level in the tank A, the tube $c^2$ and the tube $c^3$. If, however, the density of the liquid in the zone between the lower edges of the tubes $c^2$ and $c^3$ increases, the liquid level in the tube $c^2$ will rise and the float $C^5$ will ascend and close the circuit at $e'$.

The mixing vessel $A^2$ is provided with an overflow $a^x$ which insures a constant level in the mixing vessel. $A^3$ indicates a pipe delivering solution or clear liquid to the vessel $A^2$. $a'$ indicates a valve in this pipe. $B'$ indicates a cylinder or tube in the upper portion of the vessel $A^2$ and $B^2$ indicates a float which is connected to the valve $a'$. If this float merely rested on the liquid or were merely suspended therein it would not operate efficiently, but inasmuch as it is inclosed within a cylinder or casing $B'$ the latter will contain only clear liquid while the liquid in the tank surrounding said cylinder is turbid and more or less dense. Any change in the density of the liquid in the vessel $A^2$ will correspondingly affect the position of the float $B'$. Should the density in the vessel $A^2$ increase the float $B'$ will rise and actuate the valve $a'$ to admit more liquid through the pipe $A^3$. In this way by controlling the delivery of solution to the vessel $A^2$ the density of the thickened material discharged from the vessel A into the vessel $A^2$ may be maintained substantially uniform. $B^5$ indicates an agitator of any desired form for mixing or agitating the thickened material.

In Fig. 8 the decanting vessel A is of the form shown in Fig. 1, and the cylinder $B'$ is similar to that shown in Fig. 7. The float $B^2$ is connected by means of a cord $b$ with a shaft $b'$ around which is wound the upper end of the cord carrying a weight $c$. The shaft $b'$ carries a lever T weighted at $t$ and provided with a contact point $t'$ adapted to close an electric circuit at $t^2$ which circuit is in this instance shown as being provided only with an alarm bell O. The lever T may pass over a scale $T^2$ and thus indicate the position of the float and the condition of the liquid in the vessel A.

Fig. 9 shows an apparatus in which the vessel A is provided with a sweep $P'$ and with a cylinder or casing P in which a hydrometer J is located. The pulp is delivered through a feed trough $P^3$ to the inside of the cylinder P, and clear liquid may enter the trough $P^3$ from the pipe $P^2$, which latter pipe is provided with a cock or valve $p'$ which may be opened by a solenoid $p$ in an electric circuit closed at times by the hydrometer J. When conditions require it, that is to say, when the density of the liquid within the cylinder P increases, the pulp flowing through the trough $P^3$ may be diluted or made thinner by clear liquid from the pipe $P^2$ and thus the feed to the vessel A may be kept at a substantially uniform density.

The invention hereinbefore described assists greatly in the operation of processes in which uniform conditions are essential as in the process known as counter-current decantation for the separation of solutions from finely divided solids in which a number of thickeners are operated in series, and the invention is especially valuable, in connection with the Dorr thickener of the type shown in the patent hereinbefore referred to, in slime concentration by flotation, gravity concentration and the collection of all finely divided material, such as organic wastes, rubber, sewage and water purification.

It will thus be seen that my invention may be embodied in various forms of apparatus and the generic claims hereinafter made are intended to cover not only the specific forms of the apparatus shown, but also apparatus differing in construction from those herein illustrated. My improvements are applicable to apparatus of various kinds which are constructed to separate finely divided solids from a portion of the liquids in which they are suspended or for separating quickly settling solids from those suspended in the same liquid which settle more slowly.

I claim as my invention:—

1. The combination with a vessel for separating underflowing settling solids from overflowing liquids or for separating underflowing quickly settling from slowly settling overflowing solids suspended in liquids, of a hydrometer suspended in a selected zone below the plane of the overflow, an electric circuit, means operated by the hydrometer for closing the circuit when the density of the liquid in said selected zone changes, and an audible alarm included in said circuit.

2. The combination with a vessel for separating settling solids from overflowing liquids of means operated by a change of density of the liquid in a selected zone for automatically regulating the discharge of the settled material.

3. The combination with a vessel for separating settling solids from overflowing liquids of a hydrometer operated by a change of density of the liquid in a selected zone, and means actuated by the hydrometer for automatically regulating the discharge of the settled material.

4. The combination with a vessel for separating settling solids from overflowing liquids of means operated by a change of density of the liquid for sounding an alarm and regulating the discharge of the settled material.

5. The combination with a vessel for separating underflowing settling solids from overflowing liquids or for separating underflowing quickly settling from slowly settling overflowing solids suspended in a liquid, of a hydrometer suspended in a selected zone of said liquid below the plane of the overflow, a recorder, and devices connecting the hydrometer with the recorder and operating it whereby a change of density in said selected zone is indicated.

6. The combination with a vessel for separating settling solids from overflowing liquids, of means operated by a change of density of the liquid for sounding an alarm, recording such change in density and for regulating the discharge of the settled material.

7. The combination with a vessel for continuously separating finely divided solids from liquids in which they are suspended, or for continuously separating quickly settling solids from those suspended in the same liquid which settle more slowly, of means operated by a change in density of the liquid in a selected zone of the liquid for regulating the density of the discharge of the settled material.

8. The combination with a vessel for separating underflowing solids from overflowing liquid, of a tank for receiving the underflow, and means operated by a change of density of the liquid in said tank for regulating the feed of clear liquid to said tank to maintain a constant density of the material therein.

9. The combination with a vessel for separating settling solids from overflowing liquid, of means for feeding pulp thereto, and means operated by a change of density in a predetermined zone of said pulp for regulating the feed of pulp to said vessel.

10. The combination with a vessel for separating underflowing solids from overflowing liquids, of a hydrometer within said vessel operated by a change of density of the liquid in a predetermined zone therein, an electric circuit closed by said hydrometer, and means included in said circuit for regulating the discharge of the underflowing liquid.

11. The combination with a separating vessel provided with a discharge and an overflow, of a hydrometer having its active portion located in a selected zone of the liquid below the plane of the overflow, a casing inclosing a portion of said hydrometer and extending to a point above the liquid level in the separating vessel, an electric circuit which is closed when said hydrometer rises to a predetermined extent, and an audible alarm included in said circuit.

12. The combination with a separating vessel, of a hydrometer located therein, a casing extending from the upper portion of said hydrometer to a point above the liquid level in said separating vessel, an electric circuit which is closed when said hydrometer rises to a predetermined extent, and means included in said circuit for regulating the discharge of settled material.

13. The combination with a vessel for separating solids from liquids, of a float suspended in the liquid, a casing inclosing the float and extending into the liquid and also extending above the level thereof, and means operated by said float for regulating the discharge of the settled material.

14. The combination with a vessel for separating settling solids from overflowing liquids or for separating quickly settling from slowly settling solids suspended in liquid, of a float having its active portion located in a selected zone of the liquid below the plane of the overflow, a casing inclosing the float and extending into the liquid and also extending above the level of said liquid, and means operated by said float for sounding an alarm.

15. The combination with a vessel for separating solids from liquids, of a float suspended in the liquid, a casing inclosing the float and extending into the liquid and also extending above the level thereof and means operated by the float for regulating the feed to said separating vessel.

16. The combination with a vessel for separating settling solids from overflowing liquids, of means within said vessel for agitating the thickened material, means for discharging the agitated material, and means operated by a change in the density of the agitated material for automatically maintaining its density.

17. The hereindescribed method of continuously separating finely divided solids from liquid in which they are suspended, or for continuously separating quickly settling solids from those suspended in the same liquid which settle more slowly, which consists in continuously feeding the solids suspended in the liquid to a suitable vessel, continuously discharging the settled material with a portion of the liquid from said vessel, continuously overflowing a portion of the liquid and in maintaining automatically uniformity of discharge by varying the discharge when a change of density occurs in a selected zone of the pulp under treatment.

18. The hereindescribed method of continuously separating finely divided solids from liquid in which they are suspended, or for continuously separating quickly settling solids from those suspended in the same liquid which settle more slowly, which consists in continuously feeding the solids suspended in the liquid to a suitable vessel, continuously discharging the settled material with a portion of the liquid to another vessel, continuously overflowing a portion of the liquid in the first mentioned vessel and in varying the discharge or underflow from the first mentioned vessel when changes in density occur in the underflowing material delivered to the second vessel.

In testimony whereof, I have hereunto subscribed my name.

JOHN VAN NOSTRAND DORR.

Witnesses:
JAMES A. SCHWEIZER,
LAURA E. SMITH.